United States Patent [19]

Gianzero et al.

[11] Patent Number: 5,115,198
[45] Date of Patent: May 19, 1992

[54] PULSED ELECTROMAGNETIC DIPMETER METHOD AND APPARATUS EMPLOYING COILS WITH FINITE SPACING

[75] Inventors: Stanley C. Gianzero; Shey-Min Su, both of Austin, Tex.

[73] Assignee: Halliburton Logging Services, Inc., Houston, Tex.

[21] Appl. No.: 407,089

[22] Filed: Sep. 14, 1989

[51] Int. Cl.$^5$ .............................................. G01V 3/28
[52] U.S. Cl. ...................................................... 324/339
[58] Field of Search ............... 324/338, 339, 340, 342, 324/343, 346, 336

[56] References Cited

U.S. PATENT DOCUMENTS

| | | |
|---|---|---|
| 3,609,521 | 9/1971 | Desbrendes .......................... 324/343 |
| 3,808,520 | 4/1974 | Runge . | |
| 4,302,723 | 11/1981 | Moran . | |
| 4,360,777 | 11/1982 | Segesman ............................ 324/339 |
| 4,583,045 | 4/1986 | Gianzero ............................. 324/339 |

OTHER PUBLICATIONS

J. H. Moran & S. Gianzero, "Electrical Anisotropy: Its Effect on Well Logs", Developments in Geophysical Exploration Methods, vol. 3, Chapter 6, Applied Science Publishers, 1982, pp. 195-238.
Moran, J. H., Gianzero, S., "Effects of formation anisotropy on resistivity logging measurements", Geophysics, vol. 44, No. 7, Jul. 1979, pp. 1266-1286.

Primary Examiner—Walter E. Snow
Attorney, Agent, or Firm—William J. Beard

[57] ABSTRACT

The transmitter and receiver coils (35,40) in an electromagnetic dipmeter (10) are separated by a finite spacing (L) to remove borehole positional effects. Dip and strike are then determined with the same methods available for zero spacing devices by pulsing the transmitter signal.

18 Claims, 7 Drawing Sheets

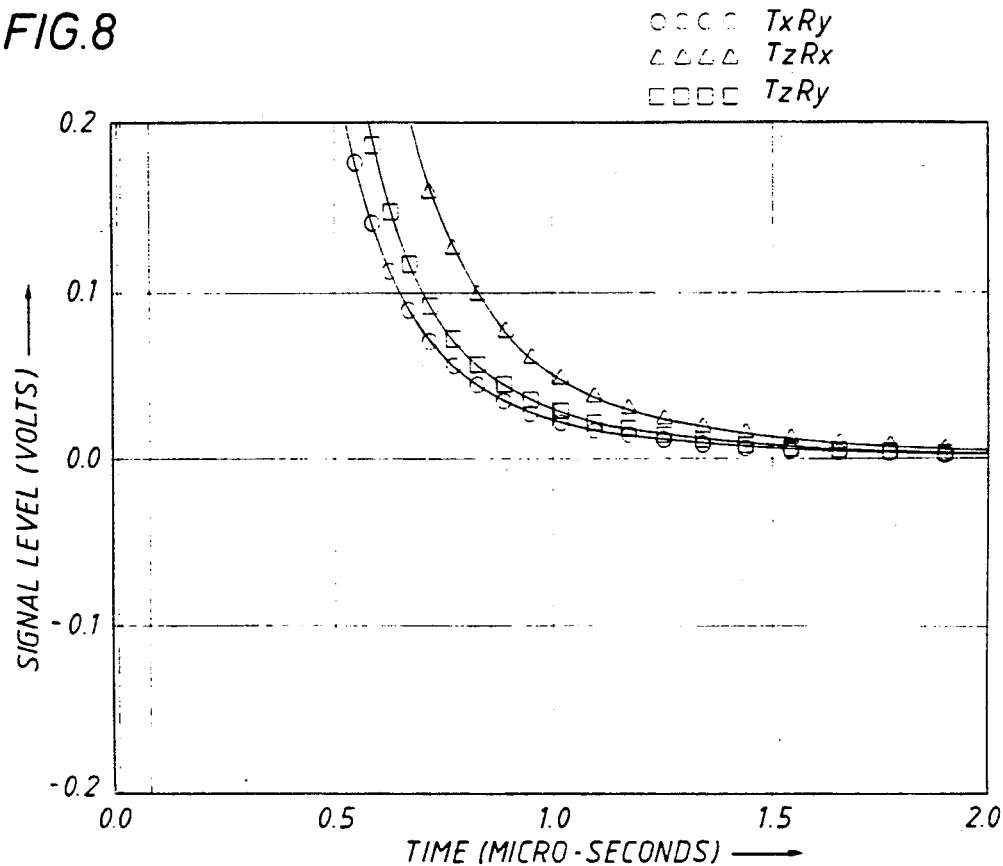
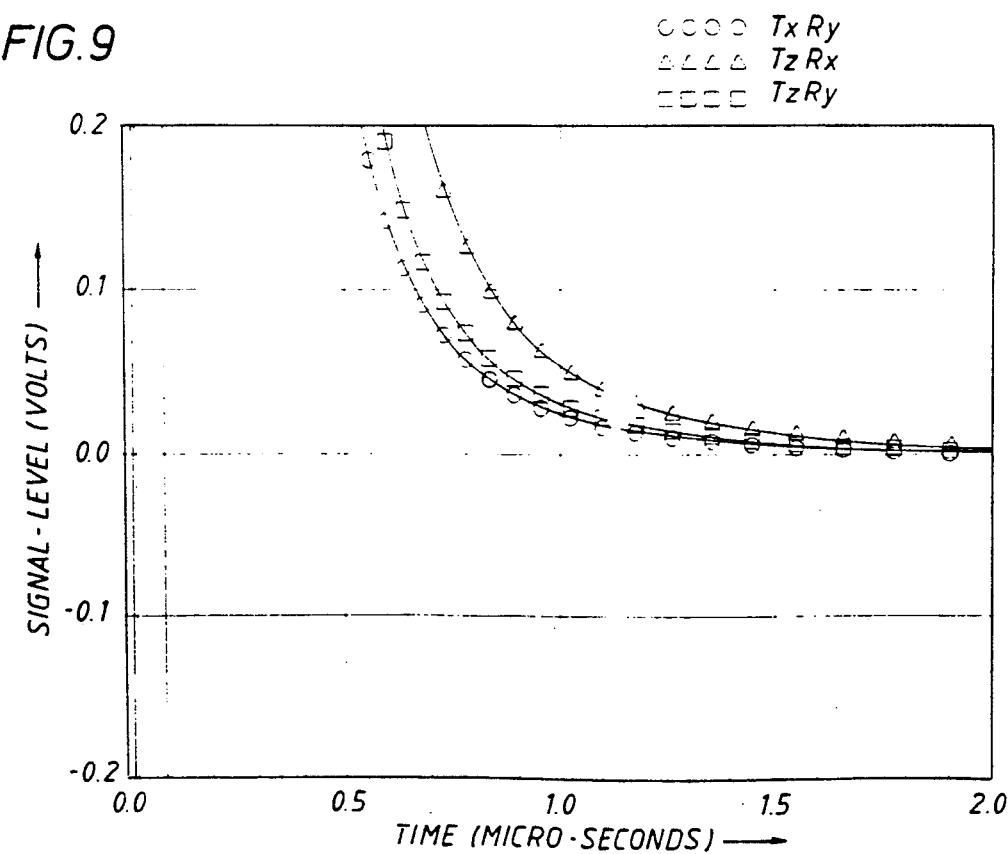

PULSED ELECTROMAGNETIC DIPMETER METHOD AND APPARATUS EMPLOYING COILS WITH FINITE SPACING

BACKGROUND OF THE INVENTION

The present invention relates to well logging tools, and more particularly to electromagnetic logging methods and apparatus for measuring properties of earth formations penetrated by a borehole. More particularly, the present invention relates to an electromagnetic dipmeter method and apparatus for measuring the dip and strike of formations relative to the borehole.

The basic principles and techniques for electromagnetic logging for earth formations are well known. Induction logging to determine the resistivity (or its inverse, conductivity) of earth formations adjacent a borehole, for example, has long been a standard and important technique in the search for and recovery of subterranean petroleum deposits. In brief, the measurements are made by inducing eddy currents to flow in the formations in response to an AC transmitter signal, and then measuring the appropriate characteristics of a receiver signal generated by the formation eddy currents. The formation properties identified by these signals are then recorded in a log at the surface as a function of the depth of the tool in the borehole.

One significant limitation of current electromagnetic logging technology has been the lack of a commerically viable regional dipmeter suitable for use in dipping formations. There have been theoretical studies, but practical solutions have not yet been found. One approach, for example, was not considered practical because of its high vulnerability to borehole effects such as caused by the borehole fluid (see J. H. Moran and S. Gianzero, "Electricall Anisotropy: Its Effect on Well Logs", Developments in Geophysical Exploration Methods, Vol. 3, Chapter 6, Applied Science Publishers, 1982, pp. 195-238, at p. 231). The Moran and Gianzero solution was otherwise quite straightforward, benefiting nicely from the simplifications afforded by using a zero spacing between the transmitter and receiver coils. Unfortunately, it was this same zero spacing which, while making it possible to specify an analytical solution for such a dipmeter, also caused the intense vulnerability to borehole effects. Adding to these limitations, zero spacing also meant that any eccentering signal proved to be much, much greater than the formation signal.

A need therefore remains for an electromagnetic dipmeter method and apparatus for measuring the dip and strike of formations relative to a borehole. More particularly, a need remains for such a dipmeter which can accurately measure the dip and strike without appreciable vulnerability to borehole effects or physical effects such as tool eccentering. Preferably, such a dipmeter will be able to analyze and determine such dip and strike information accurately, rapidly, and reliably, and without excessively complicated theoretical and/or computational procedures, so that it can afford widespread practical application and utilization in a great variety of geophysical conditions and environments.

SUMMARY OF THE INVENTION

Briefly, the present invention meets the above needs and purposes with an electromagnetic dipmeter method and apparatus which successfully uses finite spacing (e.g., one meter) between the transmitter and receiver coils, but which still enjoys the straightforward and uncomplicated solutions developed for the special zero spacing case. This substantial improvement in electromagnetic dipmeter methods and apparatus for measuring the dip and strike of formations relative to the borehole is afforded by pulsing the transmitter signal rather than operating it continuously. By using such a transient signal (for example, a pulsed transmission signal with a waiting time of $\sim 1.5$ $\mu$seconds), the coupling matrix (developed below) diagonalizes, affording a straightforward analytical solution to the signals detected from the formation. However, because the transmitter and receiver coils are significantly spaced from one another, the effects of eccentering of the tool within the borehole are minimized. In addition, pulsing with spaced coils helps reduce or eliminate borehole effects because the borehole fluid is generally salty and therefore lossy and slow. Therefore, the much stronger formation signal can be detected before the borehole signal arrives. On the other hand, in fresh or oil based muds, known borehole compensation schemes involving transmitter and/or receiver coil pairs, traids, and so forth, can also be used.

It is therefore a feature of the present invention to provide an electromagnetic formation measuring method and apparatus which employ transient signal transmission and time-dependent signal analysis; such a method and apparatus which can effectively employ finite spacing between transmitter and receiver coils in conjunction with straightforward and uncomplicated analytical solutions; to provide such methods and apparatus which can be used to provide an electromagnetic dipmeter; such methods and apparatus in which a transient signal is thus transmitted into earth formations to induce a received time-dependent signal characteristic of the formations; in which the time-dependent characteristic formation signals are measured; in which at least one predetermined property of the adjacent formations is determined from the measured time-dependent characteristic formation signals; in which at least one transmitter coil and at least one receiver coil may be used; in which the receiver coil may thus be separated from the transmitter coil by a predetermined finite spacing; in which dipmeter measurements of strike and/or dip may be made; in which borehole compensated coil configurations may be used; and to accomplish the above features and purposes in an inexpensive, uncomplicated, durable, versatile, and reliable method and apparatus, inexpensive to manufacture, and readily suited to the widest possible utilization in electromagnetic logging of earth formations.

These and other features and advantages of the invention will be apparent from the following description, the accompanying drawings, and the appended claims.

BRIEF DESCRIPTION OF THE DRAWINGS

FIGS. 6-10 and 12 show the analogous results for various finite pulse widths of the excitation current.

DESCRIPTION OF THE PREFERRED EMBODIMENT

Figure 1:
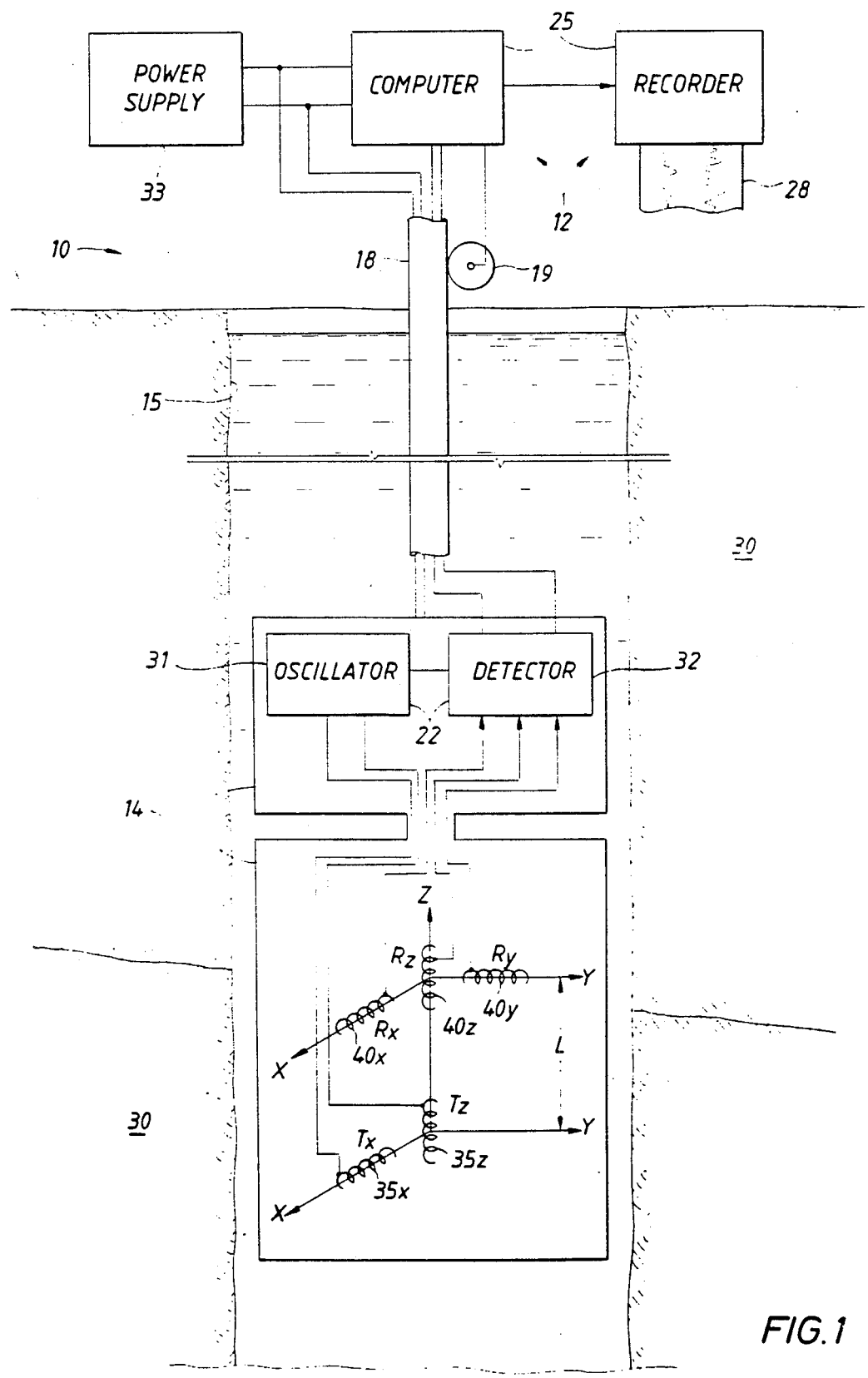
FIG. 1 is a somewhat figurative block diagram showing an electromagnetic logging apparatus according to the present invention positioned in a wellbore.

With reference to the drawings, the new and improved apparatus for electromagnetic logging, and the metod therefor according to the present invention, will be described. FIG. 1 is a somewhat figurative block diagram showing a preferred embodiment of such a logging apparatus 10. The dimensions in FIG. 1 are exaggerated and certain conventional details omitted for clarity of illustration, it being understood that in practice the coils are usually supported on a mandrel and enclosed in a non-magnetic housing (both not shown).

Mechanically, the preferred embodiment 10 employs conventional features of design and construction which are substantially the same as that shown in co-pending U.S. Pat. Application Ser. No. 40,879, filed Apr. 21, 1987, and assigned to the assignee of the present invention. The '879 disclosure is accordingly incorporated herein by reference, and, except for the improvements taught by the present invention, only an abbreviated description of the overall structure and operation of tool 10 will be given. In addition, features and concepts also known to practitioners in the art are assumed herein, in particular the teachings of Moran and Gianzero, supra, so only the conclusions taught therein will be stated below, as needed, the detailed developments thereof being omitted herein for purposes of brevity and clarity.

As shown in FIG. 1, tool 10 includes surface equipment 12 and a downhole sonde portion 14. Sonde 14 is shown supported in a borehole 15 by a conventional logging cable 18, both of which are raised and lowered within borehole 15 in known fashion by a winch 19 located in the surface equipment 12. Cable 18 connects downhole electronics 22 with a computer and recording system 25, in equipment 12, for generatiing a log 28 of the measurements of the dip and strike of the various earth formations 30 through which borehole 15 passes. Circuits 22 and 25 include oscillator 31, detector 32, power supply 33, and other circuits, as generally described in the above-noted '879 application or otherwise well known in the art. These circuits induce AC currents into the transmitter coils 35x and 35z, and then detect and measure the components of interest which are consequently induced into the receiver coils 40x, 40y, and 40z by the resulting eddy currents flowing in the formations 30 which surround the borehole. The processing of these various signals is then carried out in computer 25 as further described below.

Figure 2:
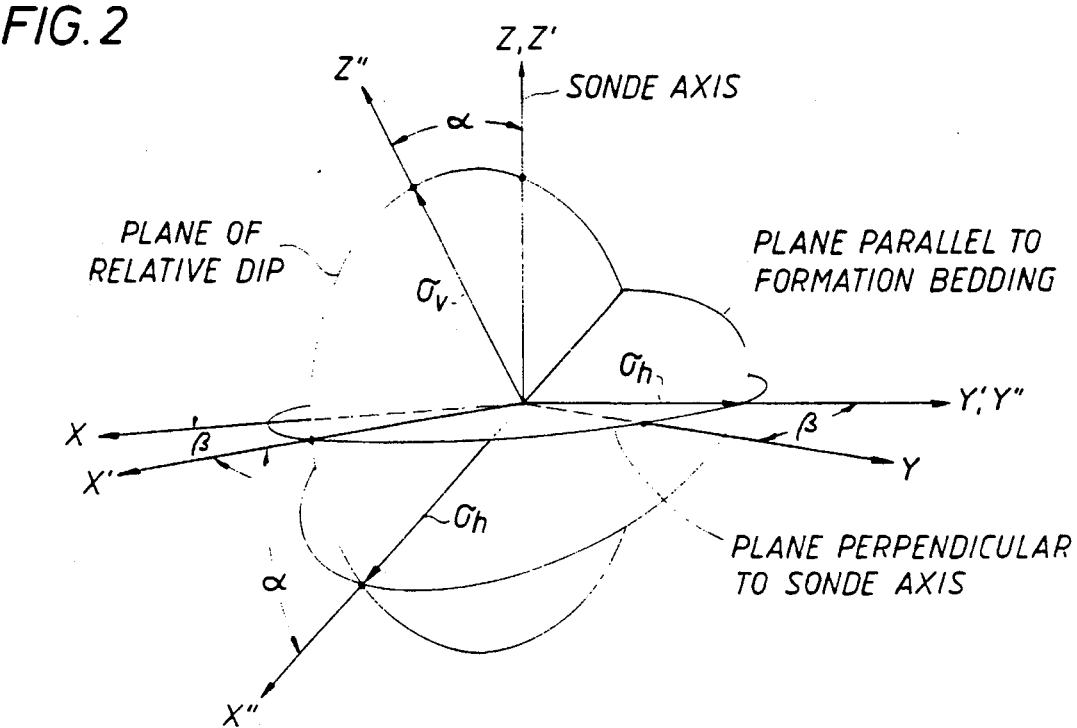
FIG. 2 illustrates the orientation of the FIG. 1 coil system relative to the formation layering.

More particularly, FIG. 2 shows schematically the orientation of the FIG. 1 coil system relative to the principal axis system of the anisotropic medium. The geometric relationships depicted in FIG. 2 will be used to develop the coupling coefficients of the electromagnetic dipmeter in the dipping anisotropic formations 30. The results will be derived for a finite spacing and will then be shown to agree with the published results for the degenerate case of zero spacing. Then it will be seen that the transient response of the electromagnetic dipmeter for long times leads to coupling coefficients which can be used to determine dip and strike in a manner completely analogous to that used for a continuous wave response.

The coupling of the magnetic moments M in the sonde system to the magnetic fields the sonde induces in the formation, and the coupling of the later to the fields H received back in the sonde from the formation, can be completely represented as a coupling matrix C, in the form:

$$\begin{pmatrix} H_x \\ H_y \\ H_z \end{pmatrix} = \begin{pmatrix} C_{xx} & C_{xy} & C_{xz} \\ C_{yx} & C_{yy} & C_{yz} \\ C_{zx} & C_{zy} & C_{zz} \end{pmatrix} \begin{pmatrix} M_x \\ M_y \\ M_z \end{pmatrix} \quad (1)$$

In order to develop the specific entries to C for the case of a dipping anisotropic formation, let us begin with the governing Maxwell equations in the principal axis system which is natural to the bedding plane of the formation (the harmonic time dependence $e^{-i\omega t}$ being implicitly assumed):

$$\nabla \times \epsilon = i\omega\mu_o H + i\omega\mu_o M \quad (2)$$

$$\nabla \times H = \sigma\epsilon \quad (3)$$

where the conducting tensors, $\sigma$, is:

$$\sigma = \begin{pmatrix} \sigma_h & 0 & 0 \\ 0 & \sigma_h & 0 \\ 0 & 0 & \sigma_v \end{pmatrix} \quad (4)$$

The simplest approach to solving the above is to consider three separate problems, one for each component of the magnetic dipole moment of the transmitter, and then solve each problem independently and superimpose the results. This will yield directly the coupling coefficients in Equation (1), which also gives the final magnetic fields in the receiver coils.

The chosen method of solution is to assume a triple Fourier Transform pair for the field components and to decompose the transverse (to z) transform components in terms of the longitudinal (axial) field components. The transverse components are determined explicitly from the solution of the longitudinal components. The results are then inverted for the total field components.

The assumed triple transform pair is given by:

$$\epsilon(r), H(r) = \frac{1}{(2\pi)^3} \int_k dk e^{ik \cdot r} E(k), H(k) \quad (5)$$

$$E(k), H(k) = \int_r dr e^{-ik \cdot r} \epsilon(r), H(r) \quad (6)$$

where the position vector, r, has component (x,y,z) in space whereas the wave number vector, k, has components ($\xi$, $\eta$, $\zeta$) in wave number space.

In like manner, the magnetic dipole moment can be represented as a continuous distribution, viz:

$$(r) = \frac{M}{(2\pi)^3} \int_k dk e^{ik \cdot r} \quad (7)$$

Solving in detail now for fields for an x-directed dipole (i.e. $M = M_x x_o$), if we insert Equations (5) and (7) into Equations (2) and (3) we have:

$$i\eta E_z - i\zeta E_y = i\omega\mu_o H_x + i\omega\mu_o M_x \quad (1\text{-}1a)$$

$$i\zeta E_z - i\xi E_z = i\omega\mu_o H_y \quad (1\text{-}1b)$$

$$i\xi E_y - i\eta E_x = i\omega\mu_o H_x \quad (1\text{-}1c)$$

$$i\eta H_z - i\zeta H_y = \sigma_h E_x \quad (1\text{-}2a)$$

$$i\zeta H_x - i\xi H_z = \sigma_h E_y \quad (1\text{-}2b)$$

$$i\xi H_y - i\eta H_x = \sigma_v E_z \quad (1\text{-}2c)$$

As mentioned earlier, we will solve for the transverse components in terms of the longitudinal components.

Thus, eliminating $E_x$ and $E_y$ in Equations (1-1a) and (1-1b) and substituting into Equations (1-2a) and (1-2c) yields:

$$\beta_h^2 H_x = -i\eta\sigma_h E_z + \xi\zeta H_z + k_h^2 M_x \quad (1\text{-}3)$$

$$\beta_h^2 H_y = i\xi\sigma_h E_z + \eta\zeta H_z \quad (1\text{-}4)$$

where $\beta_h^2 = \zeta^2 - k_h^2$.

Next, the corresponding set for $E_x$ and $E_y$ is found by eliminating $H_x$ and $H_y$ from Equations (1-1a) and (1-1b) and substituting into Equations (1-2a) and (1-2b):

$$\beta_h^2 E_x = \xi\zeta E_z + \omega\mu_o \eta H_z \quad (1\text{-}5)$$

$$\beta_h^2 E_y = \eta\zeta E_z - \omega\mu_o \xi H_z - \omega\mu_o \zeta M_x \quad (1\text{-}6)$$

The governing equations for the longitudinal field components are found by substituting Equations (1-3) and (1-4) into Equations (1-2c), and Equations (1-5) and (1-6) into Equation (1-1c):

$$H_z = \frac{-\xi\zeta M_x}{(\zeta^2 - \zeta_o^2)} \quad (1\text{-}7)$$

$$E_z = \frac{\omega\mu_o \lambda^2 \eta M_x}{(\zeta^2 - \zeta_e^2)} \quad (1\text{-}8)$$

where $\zeta_o$ and $\zeta_e$ represent the axial components of the "ordinary" and "extraordinary" modes of propagation similar to the two modes of propagation of light in a uniaxial crystal:

$$\zeta_o^2 = k_h^2 - (\xi^2 + \eta^2) \quad (1\text{-}9)$$

$$\zeta_e^2 = k_h^2 - \lambda^2(\xi^2 + \eta^2) \quad (1\text{-}10)$$

where, of course, $\lambda$ is the anisotropy coefficient given by:

$$\lambda^2 = \frac{\sigma_h}{\sigma_v} \quad (1\text{-}11)$$

Next, if we insert Equations (1-7) and (1-8) into Equations (1-5) and (1-6), and we invert these results via Equation (5), we find only three types of integrals:

$$\frac{1}{(2\pi)^3} \int_k \frac{dk e^{ik \cdot r}}{(\zeta^2 - \zeta_o^2)},$$

$$\frac{1}{(2\pi)^3} \int_k \frac{dk e^{ik \cdot r}}{(\zeta^2 - \zeta_e^2)},$$

$$\frac{1}{(2\pi)^3} \frac{\partial}{\partial x}, \frac{\partial}{\partial y} \int_k \frac{dk e^{ik \cdot r}}{(\zeta^2 - \zeta_o^2)(\zeta^2 - \zeta_e^2)}$$

At this point we will perform these integrations and then refer to the results whenever needed. The most convenient way to perform these operations is to resort to a cylindrical representation:

$$\xi = k \cos\psi \quad (1\text{-}12)$$

$$\eta = k \sin\psi \quad (1\text{-}13)$$

Then, for example, $$\frac{1}{(2\pi)^3} \int_k \frac{dk e^{ik \cdot r}}{(\zeta^2 - \zeta_o^2)} = \frac{1}{(2\pi)^3} \int_{-\infty}^{\infty} d\zeta e^{i\zeta z} \int_0^{\infty} \frac{dk k}{(k^2 - k_o^2)} \frac{1}{2\pi} \int_0^{2\pi} d\psi e^{ik\rho\cos(\psi - \phi)} \quad (1\text{-}14)$$

$$= \frac{1}{4\pi} \frac{2}{\pi} \int_0^{\infty} d\zeta \cos\zeta z \int_0^{\infty} \frac{dk k J_o(k\rho)}{(k^2 - k_o^2)} \quad (1\text{-}15)$$

$$= \frac{1}{4\pi} \frac{2}{\pi} \int_0^{\infty} d\zeta \cos\zeta z \frac{1}{2} \int_{\infty e^{i\pi}}^{\infty} \frac{dk k H_o^{(1)}(k\rho)}{(k^2 - k_o^2)} \quad (1\text{-}16)$$

where $k_o^2 = k_h^2 - \zeta^2$ and the integral representation for $J_o(k\rho)$ was employed in the above.

Figure 3:
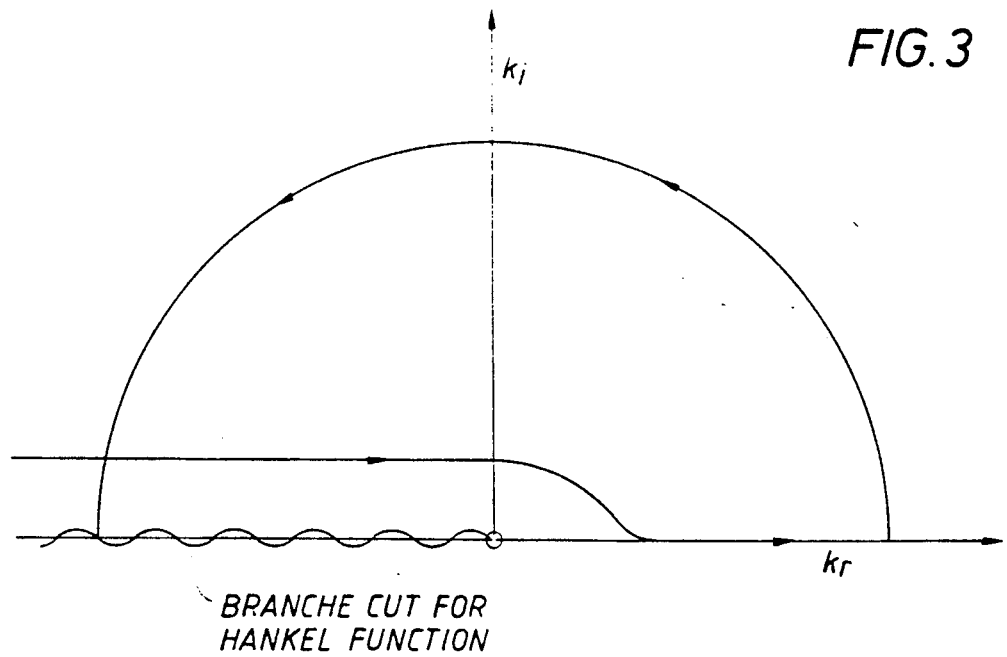
FIG. 3 is a graphical illustration of the mathematical analysis of residues in the complex k-plane, showing the contour therein.

The last transformation was introduced to appeal to the theory of the calculus of residues in the complex k-plane. Consider the contour in the complex k-plane as shown in FIG. 3. The residue contribution from the k integration in Equation (1-16) is just, $$\frac{\pi i}{2} H_0^1(i\beta_h \rho) = K_o(\beta_h \rho) \quad (1\text{-}17)$$

Consequently we can write (see A. Erdelyi, Editor, *Tables of Integral Transforms*, Bateman Manuscript Project, Vol. 1, No. 43, p. 56, McGraw Hill Book Company, New York, 1954):

$$\frac{1}{(2\pi)^3} \int_k \frac{dk e^{ik \cdot r}}{(\zeta^2 - \zeta_o^2)} = \quad (1\text{-}18)$$

$$\frac{1}{4\pi} \frac{2}{\pi} \int_0^{\infty} d\zeta \cos\zeta z K_o(\beta_h \rho) = \frac{1}{4\pi} \left( \frac{e^{ikhr}}{r} \right)$$

In a similar manner we can show that:

$$\frac{1}{(2\pi)^3} \int_k \frac{dk e^{ik \cdot r}}{(\zeta^2 - \zeta_e^2)} = \quad (1\text{-}19)$$

$$\frac{1}{4\pi\lambda^2} \frac{2}{\pi} \int_0^\infty d\zeta \cos\zeta z K_0(\beta_h\rho/\lambda) = \frac{1}{4\pi\lambda}\left(\frac{e^{ik\nu s}}{s}\right) \quad 5$$

where the "contracted" distance, s, is defined as:

$$s = \sqrt{\rho^2 + \lambda^2 z^2}$$

Finally, in the last integral all of the steps proceed as before until the final step, viz:

$$\frac{1}{(2\pi)^3}\int_k \frac{dk e^{ik\cdot r}}{(\zeta^2-\zeta_o^2)(\zeta^2-\zeta_e^2)} = \quad (1\text{-}20)$$

$$\frac{1}{4\pi} \frac{2}{\pi} \frac{1}{(\lambda^2-1)} \int_0^\infty d\zeta \cos\zeta z \left[\frac{K_0(\beta_h\rho/\lambda)-K_0(\beta_h\rho)}{\beta_h^2}\right]$$

At this stage, it is more advantageous to employ a derivative operation to the integral. For example, we can write:

$$\frac{1}{(2\pi)^3} \frac{\partial}{\partial x} \int_k \frac{dk e^{ik\cdot r}}{(\zeta^2-\zeta_o^2)(\zeta^2-\zeta_e^2)} = \quad (1\text{-}21)$$

$$-\left(\frac{x}{4\pi\rho}\right)\frac{1}{(\lambda^2-1)} \frac{2}{\pi} \int_0^\infty d\zeta \frac{\cos\zeta z}{\beta_h}\left[\frac{K_1(\beta_h\rho/\lambda)}{\lambda} - K_1(\beta_h\rho)\right] = \frac{1}{4\pi}\frac{1}{(\lambda^2-1)}\left(\frac{x}{ik_n\rho^2}\right)(e^{ik\nu s}-e^{ikhr})$$

Then, of course:

$$\frac{1}{(2\pi)^3}\frac{\partial}{\partial y}\int_k \frac{dk e^{ik\cdot r}}{(\zeta^2-\zeta_o^2)(\zeta^2-\zeta_e^2)} = \quad (1\text{-}22)$$

$$\frac{1}{4\pi}\frac{1}{(\lambda^2-1)}\left(\frac{y}{ik_n\rho^2}\right)(e^{ik\nu s}-e^{ikhr})$$

Returning to Equation (5) and using Equation (1-7) with Equation (1-18) enables us to write (the parenthetical expressions being an aid to the reader in the development of the coupling coefficients):

$$H_x(r) \frac{M_x}{(2\pi)^3} \frac{\partial^2}{\partial x \partial z} \int_k \frac{dk e^{ik\cdot r}}{(\zeta^2-\zeta_o^2)} = \quad (1\text{-}23)$$

$$\frac{M_x}{4\pi}\frac{\partial^2}{\partial x \partial z}\left(\frac{e^{ikhr}}{r}\right) \quad (\sim C_{xz})$$

On the other hand, Equation (1-3) reduces to:

$$H_x = \frac{-i\eta\sigma_h E_z}{\beta_h^2} + \frac{\xi\zeta H_z}{\beta_h^2} + \frac{k_h^2 M_x}{\beta_h^2} \quad (1\text{-}24)$$

$$= \frac{M_x}{(\zeta^2-\zeta_o^2)(\zeta^2-\zeta_e^2)}\{\xi^2[(\lambda^2-1)k_h^2-(\zeta^2-\zeta_e^2)]+k_h^2(\zeta^2-\zeta_o^2)\} \quad (1\text{-}25)$$

Consequently:

$$H_x(r) = \frac{M_x}{(2\pi)^3}\left\{-(\lambda^2-1)k_h^2\frac{\partial^2}{\partial x^2}\int_k \frac{dk e^{ik\cdot r}}{(\zeta^2-\zeta_o^2)(\zeta^2-\zeta_e^2)} + \frac{\partial^2}{\partial x^2}\int_k \frac{dk e^{ik\cdot r}}{(\zeta^2-\zeta_o^2)} + k_h^2 \int_k \frac{dk e^{ik\cdot r}}{(\zeta^2-\zeta_e^2)}\right\} \quad (1\text{-}26)$$

$$= \frac{M_x}{4\pi}\left\{ik_h\frac{\partial}{\partial x}\left(\frac{x}{\rho^2}\right)(e^{ik\nu s}-e^{ikhr})+\frac{\partial^2}{\partial x^2}\left(\frac{e^{ikhr}}{r}\right)+\frac{k_h^2}{\lambda}\left(\frac{e^{ik\nu s}}{s}\right)\right\}(\sim C_{xx}) \quad (1\text{-}27)$$

Finally:

$$H_y = \frac{i\xi\sigma_h}{\beta_h^2}E_z + \frac{\eta\zeta H_z}{\beta_h^2} \quad (1\text{-}28)$$

$$= \frac{\xi\eta M_x}{(\zeta^2-\zeta_o^2)(\zeta^2-\zeta_e^2)}[(\lambda^2-1)k_h^2-(\zeta^2-\zeta_e^2)] \quad (1\text{-}29)$$

So that:

$$y(r) = \frac{M_x}{(2\pi)^3}\frac{\partial^2}{\partial x \partial y}\left\{\int_k \frac{dk e^{ik\cdot r}}{(\zeta^2-\zeta_o^2)} - (\lambda^2-1)k_h^2\int_k \frac{dk e^{ik\cdot r}}{(\zeta^2-\zeta_o^2)(\zeta^2-\zeta_e^2)}\right\} \quad (1\text{-}30)$$

$$= \frac{M_x}{4\pi}\left\{\frac{\partial^2}{\partial x \partial y}\left(\frac{e^{ikhr}}{r}\right) + ik_h\frac{\partial}{\partial y}\left(\frac{x}{\rho^2}\right)(e^{ik_vs} - e^{ik_hr})\right\}(\sim C_{xy})$$

(1-31)

This completes the development for an x-directed dipole.

The analyses of the fields for a y-directed dipole and for a z-directed dipole are completely analogous to that for the x-directed dipole. Consequently, the results will simply be stated without proof.

Thus, if the dipole is directed along the y-axis we find:

$$H_z(r) = \frac{M_y}{4\pi} \frac{\partial^2}{\partial y \partial z}\left(\frac{e^{ik_hr}}{r}\right)(\sim C_{yz})$$ (2-5)

$$H_x(r) = \frac{M_y}{4\pi}\left[\frac{\partial^2}{\partial x \partial z}\left(\frac{e^{ik_hr}}{r}\right) + ik_h\frac{\partial}{\partial y}\left(\frac{x}{\rho^2}\right)(e^{ik_vs} - e^{ik_hr})\right](\sim C_{yx})$$ (2-6)

$$H_y(r) = \frac{M_y}{4\pi}\left\{ik_h\frac{\partial}{\partial y}\left(\frac{y}{\rho^2}\right)(e^{ik_vs} - e^{ik_hr}) + \frac{\partial^2}{\partial y^2}\left(\frac{e^{ik_hr}}{r}\right) + \frac{k_h^2}{\lambda}\left(\frac{e^{ik_vs}}{s}\right)\right\}(\sim C_{yy})$$ (2-7)

Finally, for a z-directed di-pole, we find:

$$H_z(r) = \frac{M_z}{4\pi}\left(\frac{\partial^2}{\partial z^2} + k_h^2\right)\frac{e^{ik_hr}}{r}(\sim C_{zz})$$ (3-5)

$$H_x(r) = \frac{M_z}{4\pi} \frac{\partial^2}{\partial x \partial z}\left(\frac{e^{ik_hr}}{r}\right)(\sim C_{zx})$$ (3-6)

$$H_y(r) = \frac{M_z}{4\pi} \frac{\partial^2}{\partial y \partial z}\left(\frac{e^{ik_hr}}{r}\right)(\sim C_{zy})$$ (3-7)

This completes the analysis for the determination of the magnetic fields due to an arbitrarily oriented dipole.

We are now in a position to develop the coupling coefficients for the general case. They can be specified directly by comparing the previous field components in Equations (1-23), (1-27), (1-31), (2-5), (2-6), (2-7), (3-5), (3-6), and (3-7) with Equation (1).

The results are:

$$C_{xx} = \frac{1}{4\pi}\left[ik_h\frac{\partial}{\partial x}\left(\frac{x}{\rho^2}\right)(e^{ik_vs} - e^{ik_hr}) + \frac{\partial^2}{\partial x^2}\left(\frac{e^{ik_hr}}{r}\right) + \frac{k_h^2}{\lambda}\left(\frac{e^{ik_vs}}{s}\right)\right]$$ (4-1)

$$C_{xy} = C_{yz} = \frac{1}{4\pi}\left[\frac{\partial^2}{\partial x \partial y}\left(\frac{e^{ik_hr}}{r}\right) + ik_h\frac{\partial}{\partial y}\left(\frac{y}{\rho^2}\right)(e^{ik_vs} - e^{ik_hr})\right]$$ (4-2)

$$C_{xz} = C_{zx} = \frac{1}{4\pi} \frac{\partial^2}{\partial x \partial z}\left(\frac{e^{ik_hr}}{r}\right)$$ (4-3)

$$C_{yy} = \frac{1}{4\pi}\left[ik_h\frac{\partial}{\partial y}\left(\frac{y}{\rho^2}\right)(e^{ik_vs} - e^{ik_hr}) + \frac{\partial^2}{\partial y^2}\left(\frac{e^{ik_hr}}{r}\right) + \frac{k_h^2}{\lambda^2}\left(\frac{e^{ik_vs}}{s}\right)\right]$$ (4-4)

$$C_{yz} = C_{zy} = \frac{1}{4\pi} \frac{\partial^2}{\partial y \partial z}\left(\frac{e^{ik_hr}}{r}\right)$$ (4-5)

$$C_{zx} = \frac{1}{4\pi}\left(\frac{\partial^2}{\partial z^2} + k_h^2\right)\frac{e^{ik_hr}}{r}$$ (4-6)

We are interested in the above coefficients at the receiver coils $x'=0=y'$, $z'=L$ in the sonde system, which, with the aid of a rotation matrix, reduces to the following in the bed system:

$$x = -L\sin\alpha, y = 0, z = L\cos\alpha$$ (4-7)

where L is the spacing of the tool (FIG. 1).

Carrying out all of the differentiations in the above and evaluating the results at the receiver coil yields:

$$C_{xx} = \frac{1}{4\pi L^3}\left[k_h^2L^2\cos^2\alpha e^{k_hL} - ik_hL\left(\frac{e^{ik_hLA} - e^{ik_hL}}{\sin^2\alpha}\right) + (3\sin^2\alpha - 1)(1 - ik_hL)e^{ik_hL}\right]$$ (4-8)

$$C_{xy} = 0 = C_{yz}$$ (4-9)

$$C_{xz} = \frac{-\sin\alpha\cos\alpha}{4\pi L^3} e^{ik_hL}[3(1 - ik_hL) - k_h^2L^2]$$ (4-10)

$$C_{yy} = \frac{1}{4\pi L^3}\left[\frac{k_h^2L^2}{\lambda^2 A} e^{ik_hLA} + ik_hL\left(\frac{e^{ik_hLA} - e^{ik_hL}}{\sin^2\alpha}\right) - (1 - ik_hL)e^{ik_hL}\right]$$ (4-11)

$$C_{zx} = \frac{e^{ik_hL}}{4\pi L^3}[k_h^2L^2\sin^2\alpha + (1 - ik_LL)(3\cos^2\alpha - 1)]$$ (4-12)

where the quantity, A, is defined as $\sqrt{\sin^2\alpha + \lambda^2\cos^2\alpha}/\lambda$.

There are two distinct cases to consider for the total response of the tool:

(1) A horizontal transmitter (i.e. $M_x' = M$)

(2) A vertical transmitter (i.e. $M_z' = M$) In the former case, $M_x'$ gives rise to the following components in the bedding system:

$$M_x = M \cos \alpha \cos \beta \quad (4\text{-}13)$$

$$M_y = -M \sin \beta \quad (4\text{-}14)$$

$$M_z = M \sin \alpha \cos \beta \quad (4\text{-}15)$$

whereas in the latter case we find:

$$M_x = -M \sin \alpha \quad (4\text{-}16)$$

$$M_y = 0 \quad (4\text{-}17)$$

$$M_z = M \cos \alpha \quad (4\text{-}18)$$

Using Equation (1) and the previous equations leads to the following sets of components in the bedding system.

For the horizontal transmitter:

$$H_x = M \cos \beta (C_{xx} \cos \alpha + C_{xx} \sin \alpha) \quad (4\text{-}19)$$

$$H_y = -M \sin \beta C_{yy} \quad (4\text{-}20)$$

$$H_z = M \cos \beta (C_{zz} \cos \alpha + C_{zz} \sin \alpha) \quad (4\text{-}21)$$

and for the vertical transmitter:

$$H_x = M(C_{xx} \cos \alpha - C_{xx} \sin \alpha) \quad (4\text{-}22)$$

$$H_y = 0 \quad (4\text{-}23)$$

$$H_z = M(C_{zz} \cos \alpha - C_{zz} \sin \alpha) \quad (4\text{-}24)$$

The field components in the coil system are determined from a knowledge of the "inverse" rotation matrix:

$$\begin{pmatrix} x' \\ y' \\ z' \end{pmatrix} = \begin{pmatrix} \cos\alpha\cos\beta & -\sin\beta & \sin\alpha\cos\beta \\ \cos\alpha\sin\beta & \cos\beta & \sin\alpha\sin\beta \\ -\sin\alpha & 0 & \cos\alpha \end{pmatrix} \begin{pmatrix} x \\ y \\ z \end{pmatrix} \quad (4\text{-}25)$$

If we apply the above operator to either Equations (4-19) to (4-21) or Equations (4-22) to (4-24) and select the appropriate components, we obtain:

$$T_x R_y = \frac{M}{2} \sin 2\beta [C_{xx}\cos^2\alpha - C_{yy} + C_{zz}\sin^2\alpha + C_{xx}\sin 2\alpha] \quad (4\text{-}26)$$

$$T_z R_x = \frac{M}{2} \cos\beta[(C_{zz} - C_{xx})\sin 2\alpha + 2C_{xx}\cos 2\alpha] \quad (4\text{-}27)$$

$$T_z R_y = \frac{M}{2} \sin\beta[(C_{zz} - C_{xx})\sin 2\alpha + 2C_{xx}\cos 2\alpha] \quad (4\text{-}28)$$

Using Equations (4-1) to (4-6) in Equations (4-26) to (4-28) yields:

$$T_x R_y = \frac{M \sin 2\beta}{8\pi L^3} \left[ k_h^2 L^2 \left( e^{ik_hL} - \frac{e^{ik_hLA}}{\lambda^2 A} \right) - ik_hL \frac{(1+\cos^2\alpha)}{\sin^2\alpha} (e^{ik_hLA} - e^{ik_hL}) \right] \quad (4\text{-}29)$$

-continued $$T_z R_x = \frac{M\cos\beta\sin 2\alpha}{8\pi L^3 \sin^2\alpha} ik_hL(e^{ik_hLA} - e^{ik_hL}) \quad (4\text{-}30)$$

$$T_z R_y = \frac{M\sin\beta\sin 2\alpha}{8\pi L^3 \sin^2\alpha} ik_hL(e^{ik_hLA} - e^{ik_hL}) \quad (4\text{-}31)$$

Finally, if we reduce the spacing to zero (i.e., $L \rightarrow 0$) and retain only the reactive component of the signal we find:

$$(T_x R_y)_x \rightarrow \frac{M\sin 2\beta}{8\pi\lambda^2\delta_h^3} (1 - \lambda^2)\sin^2\alpha \quad (4\text{-}32)$$

$$(T_z R_x)_x \rightarrow \frac{M\cos\beta\sin 2\alpha}{8\pi\lambda^2\delta_h^3} (1 - \lambda^2) \quad (4\text{-}33)$$

$$(T_z R_y)_x \rightarrow \frac{M\sin\beta\sin 2\alpha}{8\pi\lambda^2\delta_h^3} (1 - \lambda^2) \quad (4\text{-}34)$$

where the subscript, x, denotes the reactive component of the signal.

Consequently, the strike and dip can be determined from the following equations (see Moran and Gianzero, supra):

$$\tan\beta = \frac{T_z R_y}{T_z R_x} \quad (4\text{-}35)$$

$$\frac{\tan^2\alpha\sin 2\beta}{2} = \frac{(T_x R_y)^2}{(T_z R_x)(T_z R_y)} \quad (4\text{-}36)$$

An alternative, but mathematically equivalent, way for obtaining the same results is to first determine the coupling coefficients in the limit of small spacing:

$$C_{xx} = C_{yy} = C_h = -\frac{(\lambda^2 + 3)}{\pi\lambda^2\delta_h^3} \quad (4\text{-}37)$$

$$C_{xz} = 0 \quad (4\text{-}38)$$

$$C_{zz} = C_v = \frac{-1}{3\pi\delta_h^3} \quad (4\text{-}39)$$

Inserting Equations (4-37) and (4-39) into Equations (4-26) to (4-28) leads once again to Equations (4-32) to (4-34). Consequently, the coupling matrix in equation (1) reduces to a diagonal matrix with the same type of symmetry as the conductivity tensor itself. This fact is also true for a dipping bed which is the reason that the dip information can be obtained from the same coil orientations as used here.

We now turn to an analysis of the transient response of the electromagnetic dipmeter. From equations (4-29) through (4-31), it is recognized that we can determine the transient response of the electromagnetic dipmeter by recognizing two types of inverse transforms, viz:

$$F^{-1}(ik_hLe^{ik_hL}) \text{ and } F^{-1}(k_h^2L^2e^{ik_hL})$$

where $F^{-1}$ denotes an inverse Fourier transform. It is convenient to transform our frequency variable to the Laplace transform variable via $\omega = is$.

Then, the previous inverse transforms can be determined from a single general result:

$$-1 \; (s^{(n-1)/2}e^{-\sqrt{as}}) = \frac{e^{-a/4t}H_n\left(\sqrt{\frac{a}{4t}}\right)}{2^n\sqrt{\pi t^{(n+1)}}} \quad (5\text{-}1)$$

where $H_n$ is just a Hermite polynomial of order $n^4$.

Applying equation (5-1) to our previous two transforms results in, $$F^{-1}(ik_hLe^{ik_hL}) = L^{-1}(-\sqrt{4sT_h} \; e^{-\sqrt{4sT_h}}) = \quad (5\text{-}2)$$

$$-\sqrt{T_h/\pi t} \; \frac{e^{-T_h/t}}{2t} H_2(\sqrt{T_h/t})$$

$$F^{-1}(k_h^2Le^{ik_hL}) = L^{-1}(-4sT_he^{-\sqrt{4sT_h}}) = \quad (5\text{-}3)$$

$$-\frac{T_h}{2\sqrt{\pi}} e^{-T_h/t}H_3(\sqrt{T_h/t})$$

where we have defined a horizontal diffusion time as $T_h = \mu_0\sigma_hL^2/4$.

If we use the above results in equations (4-29) through (4-31) we find:

$$T_xR_y = \frac{M\sin2\beta}{16\pi L^3 t} \sqrt{T_h/\pi t} \left\{ T_h/t\left[\frac{e^{-T_hA^2/t}}{\lambda^2A}H_3(\sqrt{T_h/t}\;A) - e^{-T_h/t}H_3(\sqrt{T_h/t})\right] + \right. \quad (5\text{-}4)$$

$$\left. \frac{(1+\cos^2\alpha)}{\sin^2\alpha}[e^{-T_hA^2/t}H_2(\sqrt{T_h/t}\;A) - e^{-T_h/t}H_2(\sqrt{T_h/t})] \right\}$$

$$T_zR_x = \frac{M\cos\beta\sin2\alpha}{16\pi L^3 t\sin^2\alpha} \sqrt{T_h/\pi t}\;[e^{-T_h/t}H_2(\sqrt{T_h/t}) - e^{-T_hA^2/t}H_2(\sqrt{T_h/t}\;A)] \quad (5\text{-}5)$$

$$T_zR_y = \frac{M\sin\beta\sin2\alpha}{16\pi L^3 t\sin^2\alpha} \sqrt{T_h/\pi t}\;[e^{-T_h/t}H_2(\sqrt{T_h/t}) - e^{-T_hA^2/t}H_2(\sqrt{T_h/t}\;A)] \quad (5\text{-}6)$$

In the above equations the displacement currents have been neglected, which is equivalent to neglecting the early arrivals or precursors (i.e., $t >> \epsilon/\sigma$).

If we further approximate the above for large times (i.e. $T_h/t << 1$), then we can replace equations (5-4) through (5-6) with:

$$T_xR_y = \frac{3M\sin2\beta}{8tL^3}(\sqrt{T_h/\pi t})^3\frac{(\lambda^2-1)}{\lambda^2}\sin^2\alpha \quad (5\text{-}7)$$

$$T_zR_x = \frac{3M\cos\beta\sin2\alpha}{8tL^3}(\sqrt{T_h/\pi t})^3\frac{(\lambda^2-1)}{\lambda^2} \quad (5\text{-}8)$$

-continued $$T_zR_y = \frac{3M\cos\beta\sin2\alpha}{8tL^3}(\sqrt{T_h/\pi t})^3\frac{(\lambda^2-1)}{\lambda^2} \quad (5\text{-}9)$$

A comparison of equations (4-32) through (4-34) with equations (5-7) through (5-9) reveals that equations (4-35) and (4-36) can still be used to determine the strike and dip even for the transient case. This means that when the receiver and transmitter are separated by a finite distance L and a transient transmission signal is used, the same measurement pairs can be used in the transient case as in the continuous wave case to infer the same information.

However, from an operational point of view the huge borehole effect can be reduced by either filtering the borehole signal in time (i.e., it usually arrives much later for conductive muds) or relying on the intrinsic attenuation of the borehole signal itself.

It is important to recognize that all of the previous conclusions were based upon detecting the magnetic field components. In fact, it is the corresponding voltages due to these magnetic fields which are actually measured. For the continuous wave case, the only difference is a multiplicative constant proportional to the operating frequency of the tool. In the transient case, this frequency dependent term must be included in the inverse transform.

If we include this effect and carry out all of the details, the voltages corresponding to equations (5-4) through (5-6) are:

$$V_{xy} = \frac{\mu_0I(N\pi a^2)^2\sin2\beta}{64\pi L^3t^2} \sqrt{T_h/t}\left\{\sqrt{T_h/t}\left[e^{-T_h/t}H_5(\sqrt{T_h/t}) - \frac{e^{T_hA^2/t}}{\lambda^2A}H_5(\sqrt{T_h/t}\;A)\right] - \right. \quad (5\text{-}10)$$

$$\left. \frac{(1+\cos^2\alpha)}{\sin^2\alpha}[e^{-T_hA^2/t}H_4(\sqrt{T_h/t}\;A) - e^{-T_h/t}H_4(\sqrt{T_h/t})] \right\}$$

$$V_{xx} = \frac{\mu_0I(N\pi a^2)^2\cos\beta\sin2\alpha}{64\pi L^3t^2\sin^2\alpha}\sqrt{T_h/\pi t}\;[e^{-T_hA^2/t}H_4(\sqrt{T_h/t}\;A) - e^{-T_h/t}H_4(\sqrt{T_h/t})] \quad (5\text{-}11)$$

$$V_{zy} = \frac{\mu_0I(N\pi a^2)^2\sin\beta\sin2\alpha}{64\pi L^3t^2\sin^2\alpha}\sqrt{T_h/\pi t}\;[e^{-T_hA^2/t}H_4(\sqrt{T_h/t}\;A) - e^{-T_h/t}H_4(\sqrt{T_h/t})] \quad (5\text{-}12)$$

where I and a denote the current amplitude and the radius of the coil(s) respectively. Also it is assumed that there are N turns on the transmitters and receivers.

Even though equations (5-10) through (5-12) represent higher order events in time than those in equations (5-4) through (5-6), the leading order terms should be the same, so that the previous conclusions remain unaltered.

Figure 4:
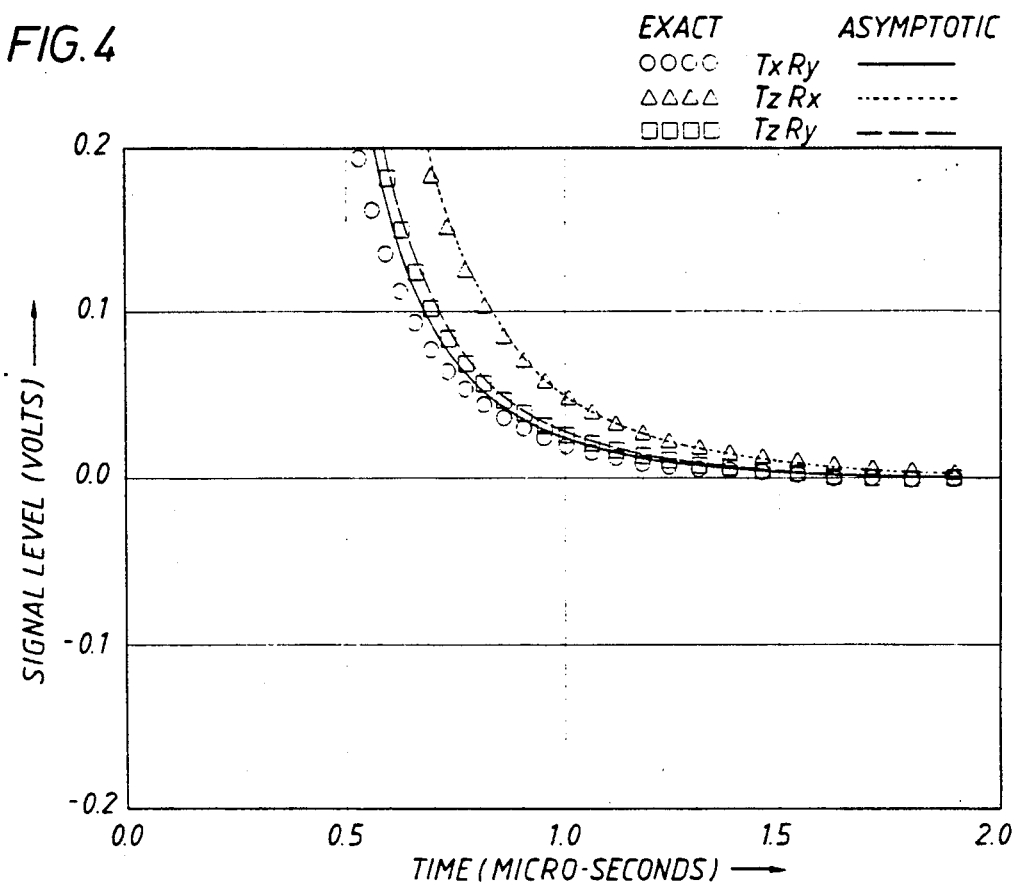
FIG. 4 illustrates graphically the impulse response, as a function of time, of an electromagnetic dipmeter, according to the present invention, located in an anisotropic formation.
Figure 5:
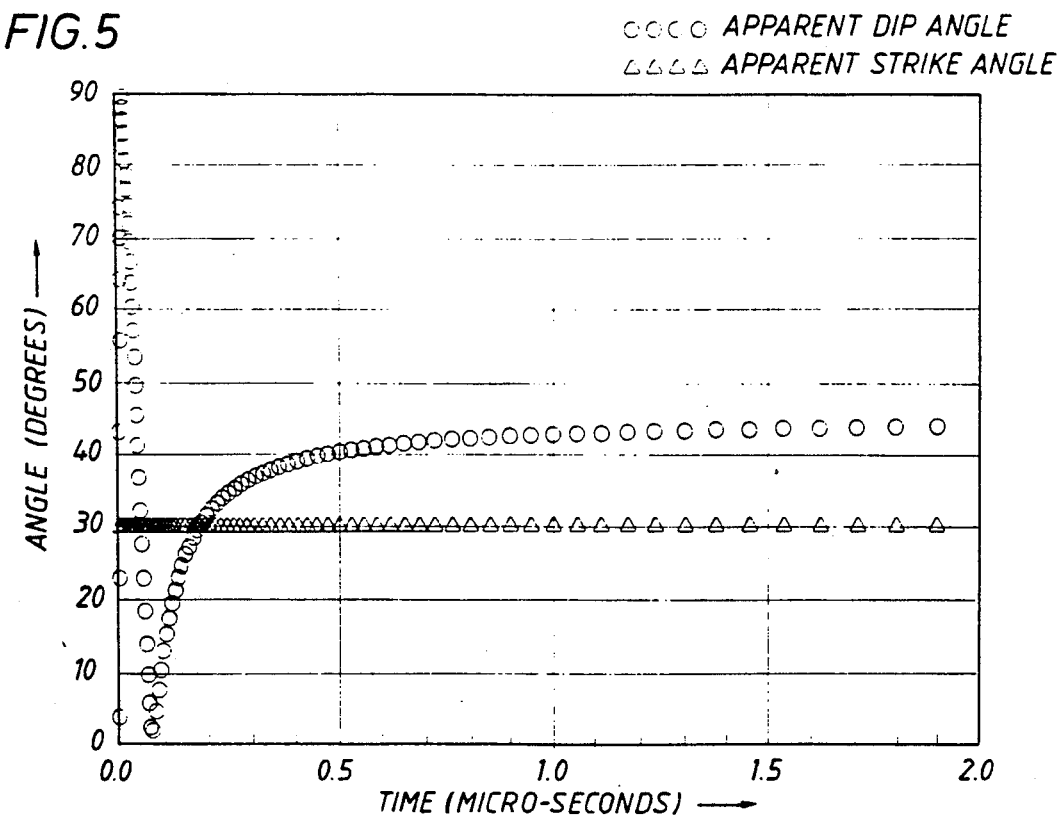
FIG. 5 is a graphical illustration of the apparent dip and strike angles obtained using the analysis taught by the present invention.
Figure 6:
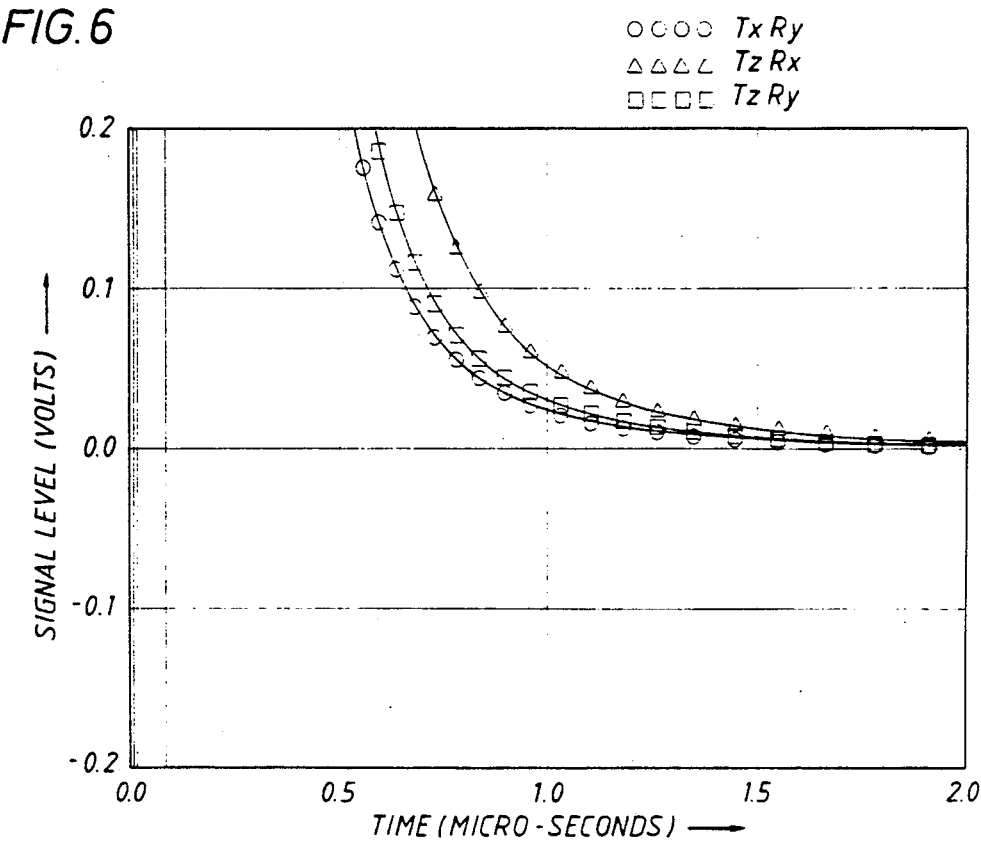
Figure 7:
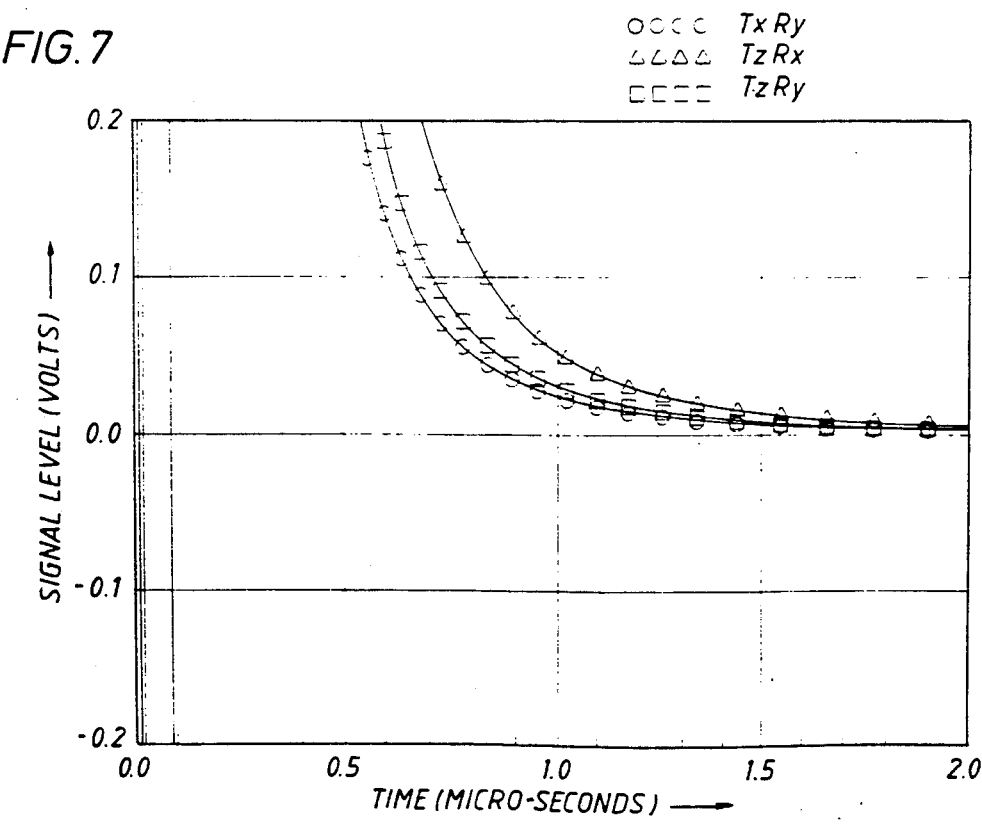
Figure 10:
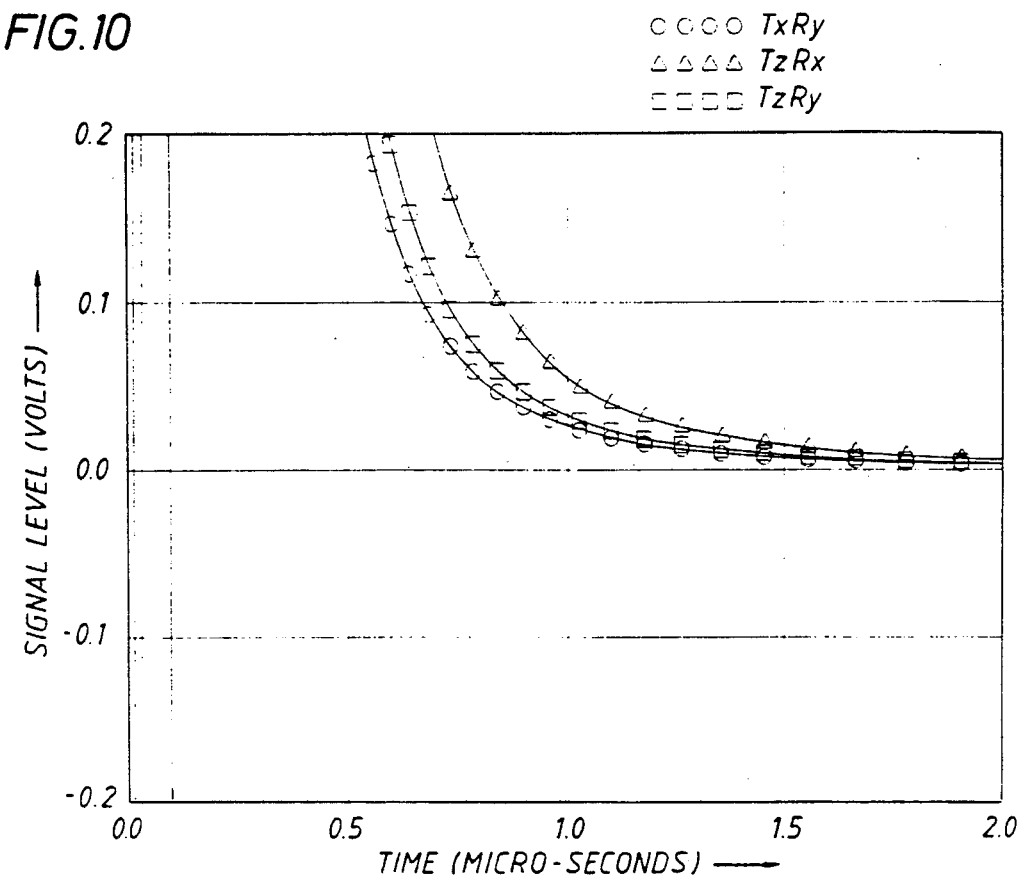

Indeed, an inspection of FIG. 4 reveals that for a spacing of 10 inches the exact voltage responses are identical for times approaching $0.5\mu$ seconds. Since the asymptotic voltages were found to be proportional to the magnetic field strengths described by equations (5-7) through (5-9), the previous conclusions remain unaltered. FIG. 5 illustrates the apparent dip and strike angles obtained using equations (4-35) and (4-36). Here again we note that after $0.5\mu$ seconds the apparent and true dips are in close agreement. Notice that the apparent strike and true strike angles are identical. This fact follows immediately from the ratio of equations (4-31) and (4-30) which determines the strike angle of any spacing.

FIGS. 6 through 10 show the analogous results for various finite pulse widths of the excitation current. Because the infinitely sharp pulse and the finite pulse are not realizable, the voltages induced in the receiver coil are unrealistic.

Figure 11A:
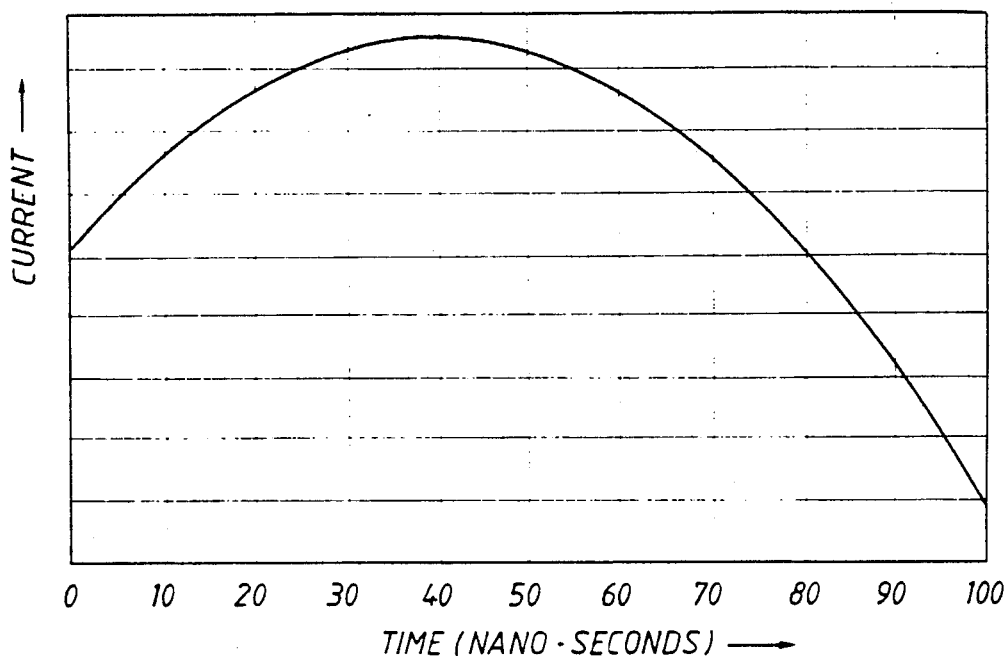
FIGS. 11a and 11b show the transmitter current and voltage disbribution.
Figure 11B:
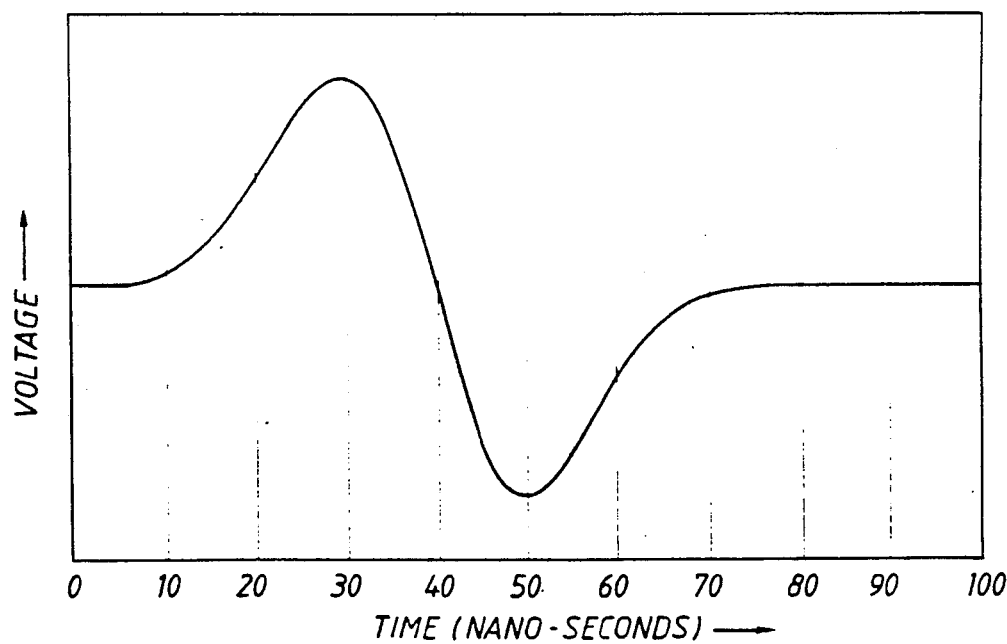

A more realistic current distribution is the Gaussian pulse. FIG. 11a illustrates the assumed transmitter current distribution, and FIG. 11b represents the corresponding voltages in a perfect inductive loop of radius 2 inches. The form of the Gaussian current was selected as:

$$i(t) = \frac{10^8}{\sqrt{2\pi}} e^{\frac{-(t-.04)^2}{2(.1)^2}} \quad (5-13)$$

where the normalization constant was chosen to insure that the integral of the current distribution was unity in conformity with previous results on the rectangular pulse. The results depicted in FIG. 12 were obtained by convolving equation (5-13) with the impulse response in equations (5-10) through (5-12).

Figure 12:
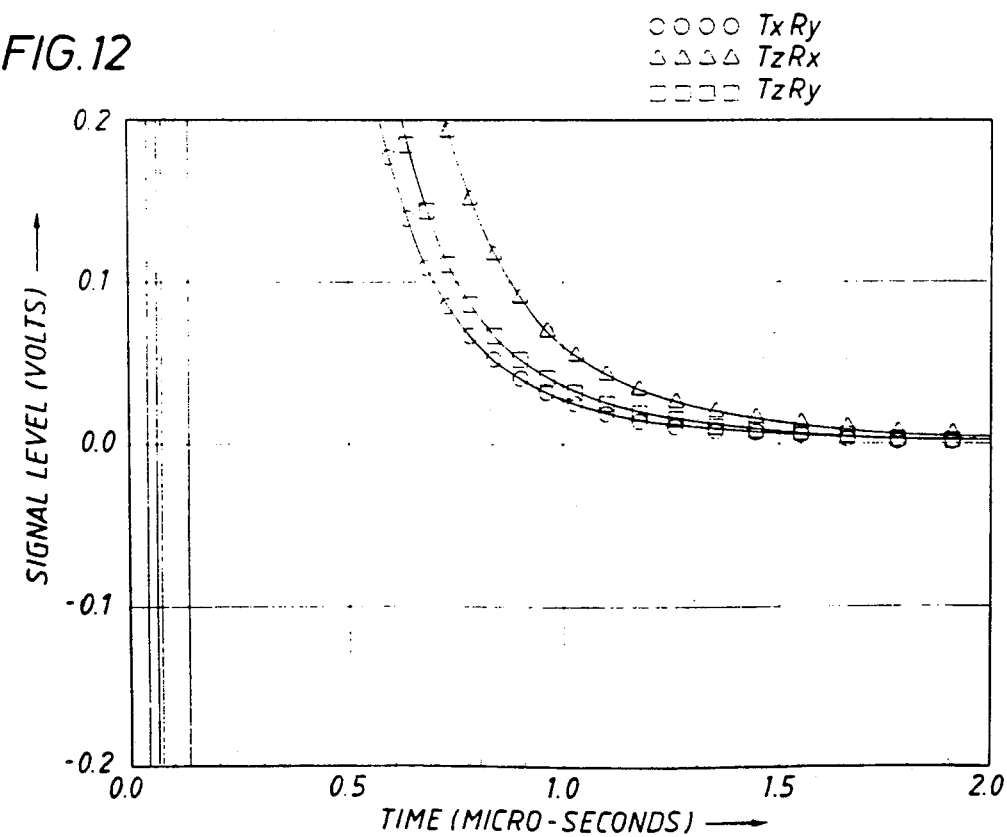

Finally, except for signal level, the results in FIG. 12 agree with those in FIGS. 5 through 10, which shows the effectiveness of the transient induction dipmeter as herein disclosed and described.

As may be seen, therefore, the present invention has numerous advantages. Principally, it now makes possible a very practical and very accurate electromagnetic dipmeter method and apparatus for measuring the dip and strike of formations relative to a borehole. The invention advantageously measures the dip and strike with little vulnerability to borehole effects, or to geometric effects such as tool eccentering, by virtue of the significant spacing afforded between the transmitter and receiver coils. The invention can analyze and determine dip and strike information accurately, rapidly, and reliably, without excessively complicated theoretical and/or computational procedures, notwithstanding this considerable coil spacing. The invention thus readily lends itself to widespread practical application and utilization in a great variety of geophysical conditions and environments.

In particular, because the transmitter and receiver coils are significantly spaced from one another, the effects of eccentering of the tool within the borehole are minimized. In addition, pulsing helps reduce or eliminate borehole effects because the borehole fluid is usually lossy and slow. Therefore, the much stronger formation signal can be detected before the borehole signal arrives.

Of course, variations in the present invention will occur to those skilled in the art upon reading the present disclosure. For example, appropriate pairs, triads, etc., of receivers and/or transmitters may be used for borehole compensation (e.g., in oil-based muds). Also, other coil configurations, such as three non-parallel transmitter coils, may be used if preferred. Additionally, logging speeds can be increased by not waiting for the full signal decay period before transmitting another pulse. That is, with appropriate and straightforward analysis, since the decay curve usually displays an exponential pattern, it is possible to predict the tail from the early part of the decay curve.

Therefore, while the methods and forms of apparatus herein described constitute preferred embodiments of this invention, it is to be understood that the invention is not limited to these precise methods and forms of apparatus, and that changes may be made therein without departing from the scope of the invention.

What is claimed is:

1. An electromagnetic dipmeter apparatus for determining properties of formations penetrated by a well borehole, the apparatus including transmitter and receiver coil means adapted for movement through such a borehole, the dipmeter apparatus comprising:

means fixedly mounting said transmitter and receiver coil means on a supportive structure for movement through a borehole;

means coupled to the transmitter coil means for transmitting a transient pulse signal into adjacent formations to induce in the receiver coil means a received formation orientation dependent signal characteristic of such formations, measuring means connected with the coil means for measuring said formation orientation dependent characteristic signal, and means associated with said measuring means for determining, from measured formation orientation dependent characteristic signal, at least the strike of the adjacent formation.

2. The apparatus of claim 1 wherein said coil means comprises at least one fixedly mounted transmitter coil and at least one fixedly mounted receiver coil.

3. The apparatus of claim 2 wherein said receiver coil is separated from said transmitter coil by a predetermined finite spacing along the supportive structure.

4. The apparatus of claim 1 wherein said fixedly mounted coil means are sufficiently spaced apart that borehole compensated.

5. An electromagnetic dipmeter for determining the dip and strike of formations penetrated by a borehole, the dipmeter including transmitter and receiver coil means adapted for movement through such a borehole, the dipmeter comprising:

means fixedly mounting said transmitter and receiver coil means on a supportive structure for movement through a borehole;

means coupled to the coil means for transmitting a transient pulsed signal into adjacent formations to induce in the coil means a received time-dependent signal characteristic of such formations, measuring means associated with the coil means for measuring said time-dependent characteristic formation signal, and means associated with said measuring means for determining, from said measured time-dependent characteristic formation signal, at least dip and strike information of the adjacent formation.

6. The apparatus of claim 5 wherein said coil means comprises at least one transmitter coil and at least one receiver coil.

7. The apparatus of claim 6 wherein said receiver coil is separated from said transmitter coil by a predetermined finite spacing along the supportive structure.

8. The apparatus of claim 7 wherein said coil means comprises at least two orthogonal transmitter coils and three orthogonal receiver coils.

9. The apparatus of claim 8 wherein said fixedly mounted coil means further are sufficiently spaced apart that comprises borehole compensated signals are obtained thereby.

10. An electromagnetic dipmeter for determining the dip and strike of formations penetrated by a borehole, the dipmeter including coil means having at least two orthogonal, horizontally oriented transmitter coils and three orthogonal receiver coils adapted for movement through such a borehole, the dipmeter comprising:
    means fixedly separating the receiver coils from the transmitter coils by a predetermined finite spacing,
    means coupled to the transmitter coils for transmitting a repeated pulse signal into adjacent formations to induce in the receiver coils a received time-dependent signal characteristic of such formations,
    measuring means associated with the coils for measuring said time-dependent characteristic formation signals, and
    means associated with said measuring means for determining, from said measured time-dependent characteristic formation signal, at least dip and strike information of the adjacent formation.

11. An electromagnetic logging metod for determining properties of formations penetrated by a borehole, comprising:
    fixedly mounting spaced apart orthogonal transmitter coils and receiver coils on a supportive structure for movement through a borehole;
    transmitting a transient pulse electromagnetic signal into the formations and receiving an induced time-dependent signal indicating positional aspects of such formations,
    measuring said time-dependent signal, and
    determining from said measured time-dependent signal at least the strike of the adjacent formation.

12. The method of claim 11 wherein said transmitting and receiving step further comprises transmitting with at least one transmitter coil and receiving with at least one receiver coil.

13. The method of claim 11 further comprising determining at least the dip of the adjacent fromation.

14. An electromagnetic logging method for determining the dip and strike of formations penetrated by a borehole, comprising:
    fixedly mounting spaced orthogonally positioned multiple transmitter coils and multiple receiver coils on a supportive structure for movement along a borehole;
    transmitting a transient pulsed electromagnetic signal into the formations and receiving an induced positional aspect dependent signal characteristic of such formations,
    measuring said positional aspect dependent characteristic formation signals, and
    determining from said positional aspect dependent characteristic formation signal at least dip and stike information of the adjacent formation.

15. The method of claim 14 wherein said transmitting and receiving step further comprises transmitting with at least one transmitter coil and receiving with at least one receiver coil.

16. The method of claim 15 including the step of separating the receiver coil from the transmitter coil by a predetermined finite spacing.

17. The method of claim 16 wherein said transmitting and receiving step further comprises transmitting with at least two orthogonal transmitter coils and receiving with at least three orthogonal receiver coils.

18. An electromagnetic logging method for determining the dip and strike of formations penetrated by a borehole, comprising:
    fixedly mounting transmitter and receiver coils along a supportive structure for movement along a borehole;
    transmitting, with at least two orthogonal, horizontally oriented transmitter coils, a repeated pulse electromagnetic signal having an initial transient into the formations and receiving, with at least three orthogonal receiver coils separated from the transmitter coils by a predetermine definite spacing, an induced time-dependent signal characteristic of such formations, said transmitting and receiving coils moving along the borehole,
    measuring said time-dependent characteristic formation signal, and
    determining from said measure time-dependent characteristic formation signal at least dip and strike information of the adjacent formation.

* * * * *